(12) United States Patent
Desnijder et al.

(10) Patent No.: US 12,070,755 B2
(45) Date of Patent: Aug. 27, 2024

(54) CROP PROCESSOR AND A MANUFACTURING PROCESS FOR A CROP PROCESSOR

(71) Applicant: CNH Industrial America LLC, New Holland, PA (US)

(72) Inventors: Dirk J. Desnijder, Wondelgem (BE); Stijn Van Belleghem, Maldegem (BE); Jan-Pieter Vanden Broucke, Moorslede (BE)

(73) Assignee: CNH Industrial America LLC, New Holland, PA (US)

( * ) Notice: Subject to any disclaimer, the term of this patent is extended or adjusted under 35 U.S.C. 154(b) by 230 days.

(21) Appl. No.: 17/791,142

(22) PCT Filed: Jan. 5, 2021

(86) PCT No.: PCT/EP2021/050098
§ 371 (c)(1),
(2) Date: Jul. 6, 2022

(87) PCT Pub. No.: WO2021/140105
PCT Pub. Date: Jul. 15, 2021

(65) Prior Publication Data
US 2023/0047284 A1    Feb. 16, 2023

(30) Foreign Application Priority Data

Jan. 6, 2020 (EP) .................................... 20150321

(51) Int. Cl.
*B02C 4/08* (2006.01)
*A01D 43/08* (2006.01)
(Continued)

(52) U.S. Cl.
CPC .............. *B02C 4/08* (2013.01); *A01D 43/081* (2013.01); *A01D 43/10* (2013.01); *B02C 4/06* (2013.01); *B02C 4/305* (2013.01)

(58) Field of Classification Search
CPC ...... A01D 82/02; A01D 43/08; A01D 43/081; A01D 43/10; B02C 4/30; B02C 4/305; B02C 4/06; B02C 4/08
See application file for complete search history.

(56) References Cited

U.S. PATENT DOCUMENTS 5,582,874 A   12/1996  Hyde
5,979,808 A   11/1999  Vogelgesang
(Continued)

FOREIGN PATENT DOCUMENTS

CN   1201073 A   12/1998
CN   1766152 A   5/2006
(Continued)

OTHER PUBLICATIONS

"New and Refurbished Corrugating Rolls", Published by International Paper Board Institute, Nov. 2014 (three pages).
(Continued)

*Primary Examiner* — Bobby Yeonjin Kim
(74) *Attorney, Agent, or Firm* — Peter K. Zacharias; Rebecca L. Henkel; Rickard K. DeMille (57) ABSTRACT

A crop processor for cracking kernels in a forage harvester, the crop processor including: a housing having an inlet and an outlet; and a first and a second comminuting roll mounted inside the housing, the comminuting rolls being arranged in parallel to define an opening between the rolls, the comminuting rolls being configured to rotate, during use, in opposing rotation directions to transport a flow of harvested crop, received from the inlet, through the opening towards the outlet, wherein the first comminuting roll is configured to
(Continued)

rotate at a greater speed than the second comminuting roll; wherein the first and second comminuting rolls each include a plurality of teeth arranged on a circumferential surface of the comminuting roll, each of the plurality of teeth includes a leading edge which faces in the rotation direction of that comminuting roll.

14 Claims, 7 Drawing Sheets

(51) Int. Cl.
   *A01D 43/10* (2006.01)
   *B02C 4/06* (2006.01)
   *B02C 4/30* (2006.01)

(56) References Cited

U.S. PATENT DOCUMENTS

| | | |
|---|---|---|
| 9,833,785 B2 | 12/2017 | Den Boer et al. |
| 9,894,833 B2 | 2/2018 | Lutz et al. |
| 10,091,938 B2 | 10/2018 | Lutz et al. |
| 10,561,067 B2 | 2/2020 | Scherer et al. |
| 11,058,061 B2 | 7/2021 | Lutz et al. |
| 2010/0043371 A1 | 2/2010 | Rieck et al. |
| 2017/0020066 A1 | 1/2017 | Lutz et al. |
| 2017/0118917 A1* | 5/2017 | Lutz ........................ B02C 7/13 |
| 2018/0116117 A1* | 5/2018 | Lutz ........................ B02C 4/08 |
| 2019/0119802 A1* | 4/2019 | Suidzu ..................... C23C 4/02 |

FOREIGN PATENT DOCUMENTS

| | | |
|---|---|---|
| CN | 104004861 A | 8/2014 |
| DE | 29719518 U1 | 12/1997 |
| DE | 102005053049 B4 | 8/2007 |
| DE | 202009000431 U1 | 3/2009 |
| DE | 202013005497 U1 | 6/2013 |
| DE | 102013104587 B4 | 4/2015 |
| EP | 0525422 A2 | 2/1993 |
| EP | 1516523 B1 | 1/2008 |
| EP | 2666352 A1 | 11/2013 |
| WO | 201575157 A1 | 5/2015 |
| WO | WO-2015075157 A1 * | 5/2015 ............. A01D 43/10 |

OTHER PUBLICATIONS

"Mitsubishi Corrugating Rolls—The Depth of Performance", Published by Mitsubishi Heavy Industries America, Inc. (four pages).
International Search Report and Written Opinion for PCT Application No. PCT/EP2021/050098 dated Mar. 19, 2021 (12 pages).
Extended European Search Report for EP Application No. 20150321.6 dated Jun. 19, 2020 (6 pages).

* cited by examiner

CROP PROCESSOR AND A MANUFACTURING PROCESS FOR A CROP PROCESSOR

TECHNICAL FIELD

The present invention relates to the field of forage harvesters, and more specifically to crop processors for cracking crop kernels in such harvesters. The invention also relates a method of manufacturing a crop processor for a forage harvester.

BACKGROUND

Forage harvesters are used to harvest crop from a field and to then comminute the harvested crop before expelling it through a spout and into a trailer traveling in close proximity of the forage harvester. Forage harvesters are often equipped with a crop processor that cracks—or pulverises—the kernels in the harvested crop. Typically, the crop processor includes a pair of crop comminuting rolls, each having a plurality of teeth on their circumference; the teeth having a height in radial direction and extending in axial direction of the rolls.

Both of the crop comminuting rolls are mounted in a housing which comprises an inlet and an outlet. The comminuting rolls are arranged such that there is a small opening between their outer peripheries. During use, the crop comminuting rolls are rotated in opposing circumferential directions (i.e. one roll is rotated in a clockwise direction and the other roll is rotated in a counter-clockwise direction) such that the harvested crop, which is fed to the rolls via the inlet, is passed through the small opening between the rolls, thereby cracking the kernels by means of the teeth. The flow of harvested crop is then expelled from the housing via the output.

The wear caused by the kernel cracking process, itself, can also result in the formation of irregular openings between the rolls, e.g. when the flow of material is not uniformly distributed along the length of the rolls. Wearing of the teeth can inhibit the crop processor's ability to crack crop kernels consistently. As a result, the comminuting rolls must be replaced at more regular intervals, thereby increasing the maintenance costs of the forage harvester.

To enable the teeth to withstand wear caused by the kernel cracking, it is known to configure the teeth of the comminuting rolls such that the leading and trailing edges of the teeth exhibit a uniform hardness. For example, the comminuting rolls are subjected to an induction hardening treatment which involves inducing an alternating magnetic field in the surface of the comminuting rolls to cause localised heating of the roll's peripheral surface to a temperature which is above the transformation range of the constituent alloy. The localised heating leads to hardening of the peripheral surface which results in an equal hardening effect on both the leading and trailing edges of the teeth.

To further increase the wear resistance of the comminuting rolls, the surface of the teeth can also be coated with a thin hard chrome layer, following the induction hardening treatment. Such chrome plating techniques typically require the use of hexavalent chromium which is a toxic substance, the use of which is increasingly restricted by government legislation.

A drawback of induction hardening process is that it tends to concentrate energy in a tip region of the teeth, causing localised melting of the tip region. The hardening process also causes deformation in the roll due to metallurgical transitions in the material. A disadvantage of the chrome electro-plating process is that it causes indiscriminate hardening of both the leading and trailing edges of the teeth, which contributes to the irregular wearing of the comminuting rolls during operation of the crop processor. In particular, the uniform hardening causes a gradual, but irreversible blunting of the teeth of the comminuting rolls during operation of the crop processor.

It would be desirable to improve the resistance to wear of the comminuting rolls of a crop processor for a forage harvester.

SUMMARY OF INVENTION

According to a first aspect of the invention there is provided a crop processor for cracking kernels in a forage harvester, the crop processor comprising: a housing having an inlet and an outlet; and a first and a second comminuting roll mounted inside the housing, the comminuting rolls being arranged in parallel to define an opening between the rolls, the comminuting rolls being configured to rotate, during use, in opposing rotation directions to transport a flow of harvested crop, received from the inlet, through the opening towards the outlet, wherein the first comminuting roll is configured to rotate at a greater speed than the second comminuting roll; wherein the first and second comminuting rolls each comprise a plurality of teeth arranged on a circumferential surface of the comminuting roll, each of the plurality of teeth comprises a leading edge which faces in the rotation direction of that comminuting roll; wherein the leading edge of the teeth of the second comminuting roll comprises a hard region having a greater hardness than the leading edge of the teeth of the first comminuting roll.

During operation of the crop processor, crop material is crushed between the leading edge of the faster moving first comminuting roll and the trailing edge of the slower moving second comminuting roll. Advantageously, the leading edge of the teeth of the first comminuting roll is worn relative to the trailing edge which leads to a sharpening of the teeth of the first comminuting roll by the crop material, which thereby prolongs the life of the crop processor.

The teeth of the first comminuting roll may comprise a trailing edge which faces away from the rotation direction of the first comminuting roll, the trailing edge comprises a hard region having a greater hardness than the leading edge of the teeth of the first comminuting roll.

The hard region of the leading edge of the teeth of the second comminuting roll may have a greater hardness than a trailing edge of the teeth of the second comminuting roll arranged to face away from the rotation direction of the second comminuting roll. Similarly to the first comminuting roll, the trailing edge of the second comminuting roll will be caused to wear away quicker than the hard region of the leading edge, which will result in a sharpening of the teeth of the second comminuting roll during operation of the crop processor.

The hard region of the trailing edge of the teeth of the first comminuting roll may be configured with a hardness which is greater than the trailing edge of the teeth of the second comminuting roll. The hard region of the leading edge of the teeth of the second comminuting roll may be configured with a hardness which is greater than the leading edge of the teeth of the first comminuting roll.

The plurality of teeth of the first comminuting roll may comprise a substantially flat-top edge. The substantially flat-top edge may comprise a hard region having a greater hardness than the leading edge of the teeth of the first comminuting roll.

The plurality of teeth of the second comminuting roll may comprise a substantially flat-top edge. The substantially flat-top edge may comprise a hard region having a greater hardness than the trailing edge of the teeth of the second comminuting roll.

The hard region may comprise a wear resistant layer having been deposited by laser-cladding. The wear resistant layer may comprise tungsten carbide.

The plurality of teeth may comprise an air hardened surface region. The plurality of teeth may be manufactured from steel, or any suitable material which has sufficient hardenability to enable air hardening of the teeth surfaces.

At least one edge of the teeth may comprise a laser hardened surface region. The laser hardened surface region may be formed on an edge of the teeth which is not clad with wear resistant material.

The plurality of teeth may have an asymmetrical profile in an axial section of the comminuting roll. The axial section is defined as a cross section obtained by slicing through the comminuting roll, along a plane which intersects at a right angle to the longitudinal axis of the roll. The axial plane may otherwise be defined as the transverse section of the roll.

According to a second aspect of the invention, there is provided a forage harvester comprising a crop processor according to any of the preceding paragraphs.

According to third aspect of the invention, there is provide a method of manufacturing a crop processor for cracking kernels in a forage harvester, the method comprising: manufacturing a first and a second comminuting roll; and, assembling the comminuting rolls into a housing having an inlet and an outlet, the comminuting rolls being arranged in parallel to define an opening between the comminuting rolls, the comminuting rolls being configured to rotate, during use, in opposing directions to transport a flow of harvested crop, received from the inlet, through the opening towards the outlet, wherein the first comminuting roll is configured to rotate at a greater speed than the second comminuting roll; wherein manufacturing the crop comminuting rolls comprises: providing a pair of substantially cylindrical shaped rolls; machining a plurality of teeth in the substantially cylindrical shaped rolls, each of the plurality of teeth comprising a leading edge arranged, during use, to face in a rotation direction of the crop comminuting roll; and forming a hard region on the leading edge of the teeth of the second comminuting roll, the hard region having a greater hardness than the leading edge of the teeth of the first comminuting roll.

The method may comprise forming a hard region on a trailing edge of the teeth of the first comminuting roll arranged to face away from the rotation direction of first comminuting roll, the hard region having a greater hardness than the leading edge of the teeth of the first comminuting roll.

The method may comprise forming a hard region on the leading edge of the teeth of the second comminuting roll having a greater hardness than a trailing edge of the teeth of the second comminuting roll, the trailing edge being arranged to face away from the rotation direction of the second comminuting roll.

The method may comprise laser-cladding a wear resistant layer onto the leading or trailing edge of the teeth of the first or second comminuting rolls.

The method may further comprise air hardening at least one edge of the teeth of the comminuting rolls. Air hardening of the at least one edge of the teeth may be performed prior to, or after, laser-cladding the wear resistant layer. For example, manufacturing the comminuting rolls may comprise air hardening the cylindrically shaped rolls prior to laser-cladding the wear resistant layer. Air hardening may be achieved after the wear resistant layer has been deposited due to the heat input of the laser cladding process.

Manufacturing the comminuting rolls may comprise laser hardening an edge of the teeth which is not clad with a wear resistant layer. The laser hardening may comprise heating an edge of the teeth with a laser source, the heat treated tooth then being allowed to cool in air to cause air hardening of the tooth edge. Laser hardening of the non-clad edge of the teeth may be performed prior to, or after, laser-cladding the teeth with the wear resistant layer.

Within the scope of this application it is expressly intended that the various aspects, embodiments, examples and alternatives set out in the preceding paragraphs, in the claims and/or in the following description and drawings, and in particular the individual features thereof, may be taken independently or in any combination.

BRIEF DESCRIPTION OF THE DRAWINGS

One or more embodiments of the invention will now be described, by way of example only, with reference to the accompanying drawings, in which.

DETAILED DESCRIPTION

In the following detailed description, reference is made to the accompanying drawings which form a part hereof, and which illustrate specific embodiments of the invention. These embodiments are described in sufficient detail to enable those of ordinary skill in the art to make and use them. Aspects of the present invention will now be described with reference to FIGS. 1 to 9.

Figure 1:
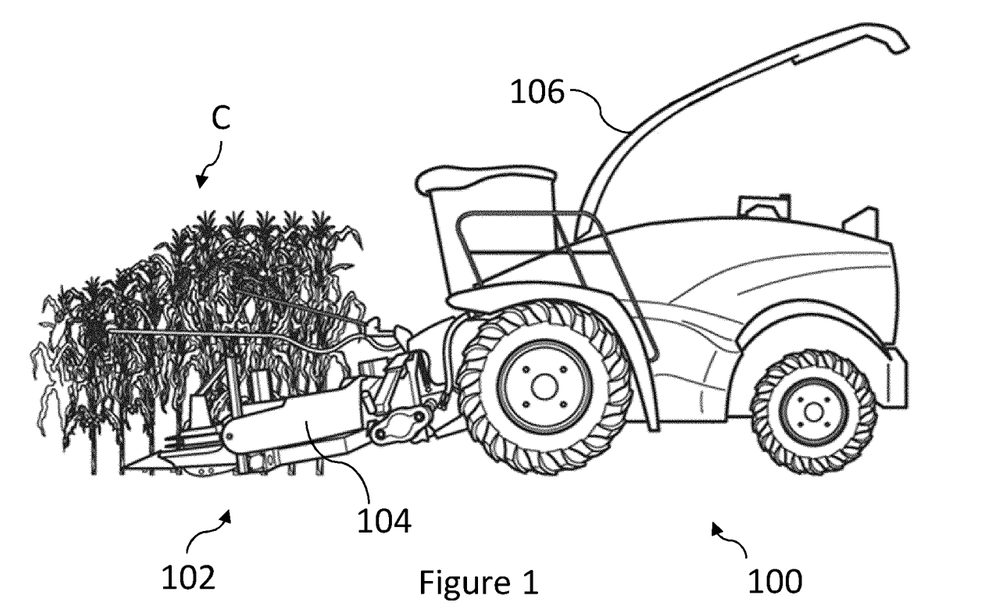
FIG. 1 is a side view of a forage harvester in accordance with the invention.

FIG. 1 shows a harvesting vehicle 100 in the form of a forage harvester 100. The forage harvester 100 is configured to harvest crops C such as maize and grass that can, for example, be used in the production of animal feed.

Figure 2:
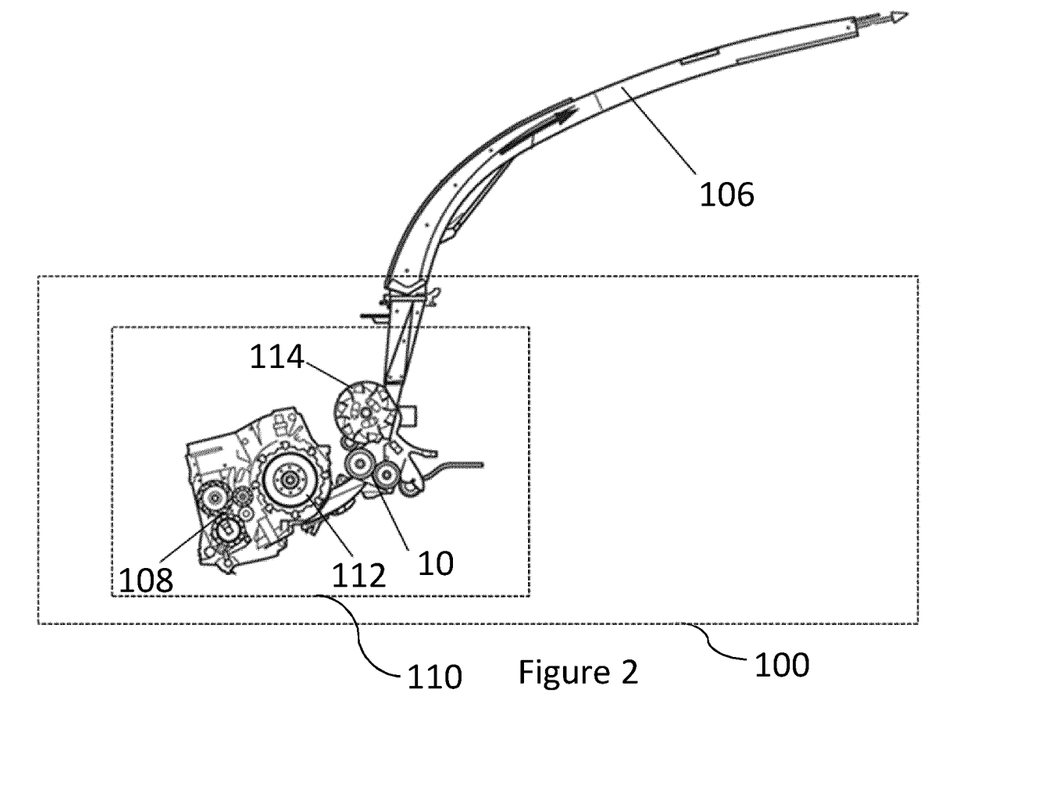
FIG. 2 is a schematic view of a crop flow channel of the forage harvester of FIG. 1.

To this end, a front end 102 of the forage harvester 100 comprises a header 104, a crop processor 10 and a spout 106. The header 104 is configured to cut and gather crop C from a field as the forage harvester 100 moves forward. A set of feed rolls 108 is arranged to draw the cut crop into a crop flow channel 110, as shown in FIG. 2. In the crop flow channel 110, the crop is processed and then guided into the spout 106. The spout 106 discharges the crop material out of the forage harvester 10 into a trailer (not shown) adjacent to or behind the forage harvester 100.

To harvest maize, for example, the crop flow channel 110 comprises a chopper 112, a crop processor 10 and a blower 114, the crop processor 10 being arranged between the chopper 112 and the accelerator 114. The chopper 112 chops the crop drawn into the crop flow channel 110 into small pieces. The crop processor 10 then grinds and crushes the chopped crops, including the maize kernels, so as to make accessible all available nutrients therefrom. To this end, the crop processor 10 is made up of two toothed rolls with a very small gap therebetween. The accelerator 114 then accelerates (most of) the processed crop into the spout 106 for discharging. The feed rolls 108, the chopper 112, the crop processor 10, the accelerator 114 and the spout 106 are shown in FIG. 2.

Figure 3:
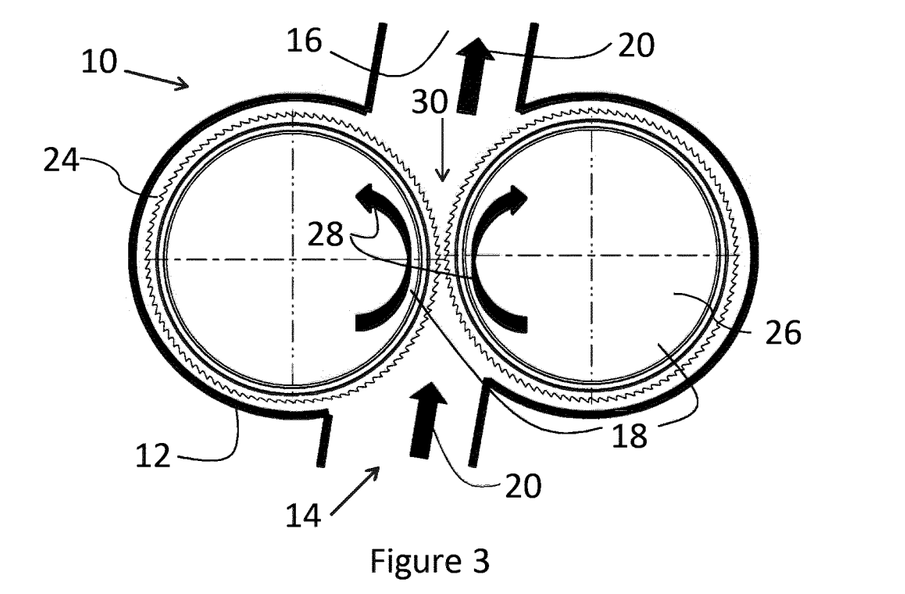
FIG. 3 is a cross-sectional view of a crop processor according to the present invention.

A crop processor 10 according to the present invention is shown in FIG. 3. The crop processor 10 is arranged to be mounted within a forage harvester, as would commonly be known in the art. During use, the harvested crop is fed through the crop processor 10 whereupon they are cracked open before being expelled from the harvester through a spout.

Figure 4:
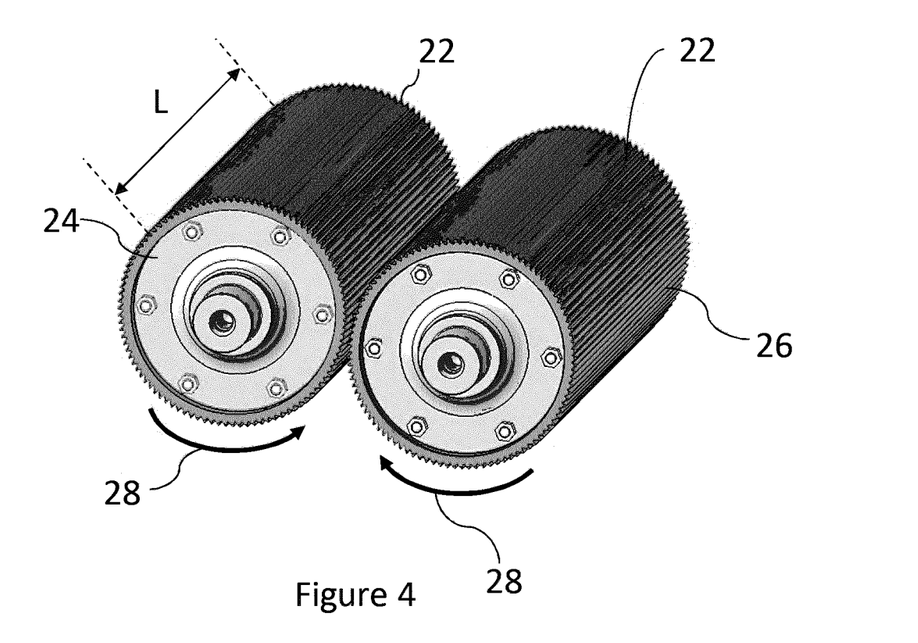
FIG. 4 is a perspective view of a pair of crop comminuting rolls, of the crop processor of FIG. 3, in an assembled state.

The crop processor 10 comprises a housing 12 having an inlet 14 and an outlet 16 and a pair of crop comminuting rolls 18 arranged in a path (indicated by the arrows 20) between the inlet 14 and the outlet 16. Each comminuting roll 18 is provided with a plurality of teeth 22 arranged along a circumference of the comminuting rolls 18. The plurality of teeth 22 extend along the length of the comminuting rolls, in an axial direction, as shown in FIG. 4 which illustrates a perspective view of the crop comminuting rolls 18 in isolation from the housing 12. In this way, the plurality of teeth 22 are arranged to cover at least a portion of a circumferential surface of each of the comminuting rolls 18.

Figure 5:
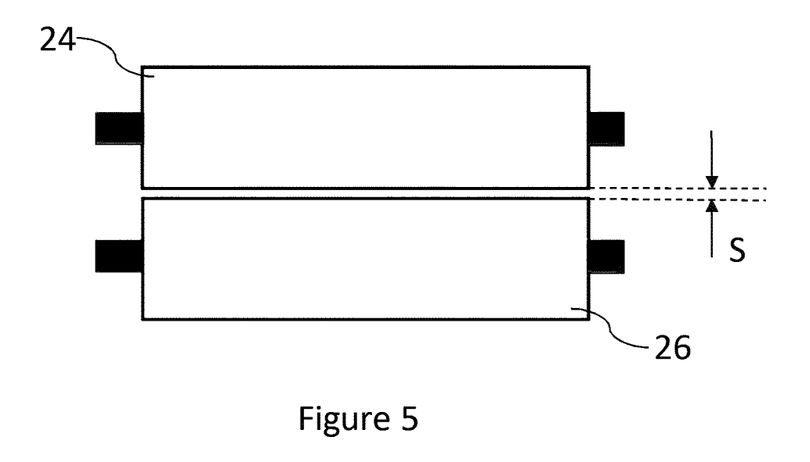
FIG. 5 is a plan view of the pair of crop comminuting rolls of FIG. 4, illustrating an opening between the crop comminuting rolls.

The crop comminuting rolls 18 are mounted parallel to each other in the housing 12 of the crop processor 10. In this way, the crop comminuting rolls 18 are arranged such that their respective longitudinal axes are substantially aligned with one another. The crop comminuting rolls 18 are spaced apart so as to define an opening between the rolls 18. The opening 30 between the crop comminuting rolls 18 comprises a depth—or spacing (S), as shown in FIG. 5 which illustrates a plan view of the crop comminuting rolls 18 in isolation from the housing 12. The opening 30 has a substantially equal depth along the length of the rolls 18, owing to the parallel alignment of the comminuting rolls 18 within the housing 12.

The crop comminuting rolls 18, as applied in a crop processor 10 according to the present invention, have a diameter ranging from 200 mm to 450 mm and are provided with a number of teeth along its circumference, ranging from 90 to 300. The pair of crop comminuting rolls 18 includes a first comminuting roll 24 and a second comminuting roll 26. The first comminuting roll 24 is arranged to rotate in a counter-clockwise direction whereas the second comminuting roll 26 is arranged to rotate in a clockwise direction (as indicated by arrows 28 in FIGS. 3, 4, 6, 7a and 7b).

During operation of the crop processor 10, a flow of harvested crops entering the crop processor 10 via the inlet 14, is directed—or transported—by the plurality of teeth 22 and forced through the opening 30 that is provided between the outer cylindrical peripheries of the rolls 18 and further towards the outlet 16 through which it is then expelled from the crop processor 10.

Figure 6:
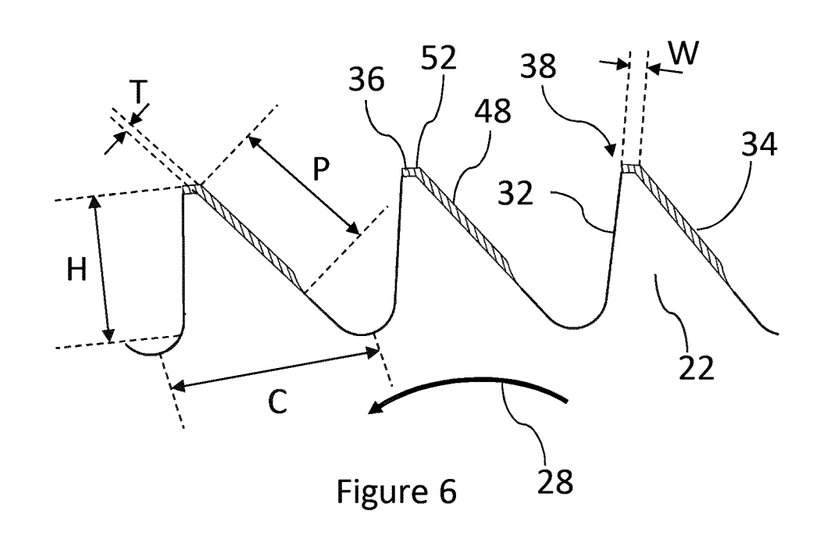
FIG. 6 is a cross-sectional view of a plurality of teeth of a first crop comminuting roll of FIG. 3.

The plurality of teeth 22 on each of the comminuting rolls 24, 26 have a substantially triangular profile, as shown in FIG. 6. The plurality of teeth 22 are arranged with an asymmetrical profile when viewed from an axial section of the comminuting roll 24, 26.

The axial section is defined as a cross section obtained by slicing through the comminuting roll 24, 26, along a plane which intersects at a right angle to a longitudinal axis of the roll.

Each tooth has a height (H) which is measured in a substantially radial direction of the roll on which the tooth is arranged. The plurality of teeth 22 each further comprise a length (L), which is measured in an axial direction of the comminuting rolls 18, as shown in FIG. 4. According to the presently described arrangement, the length (L) of the plurality of teeth 22 is equal to the length of the comminuting roll 18 on which the teeth are arranged. Each tooth further comprises a width C which is measured in a substantially circumferential direction of the respective roll.

Figure 7A:
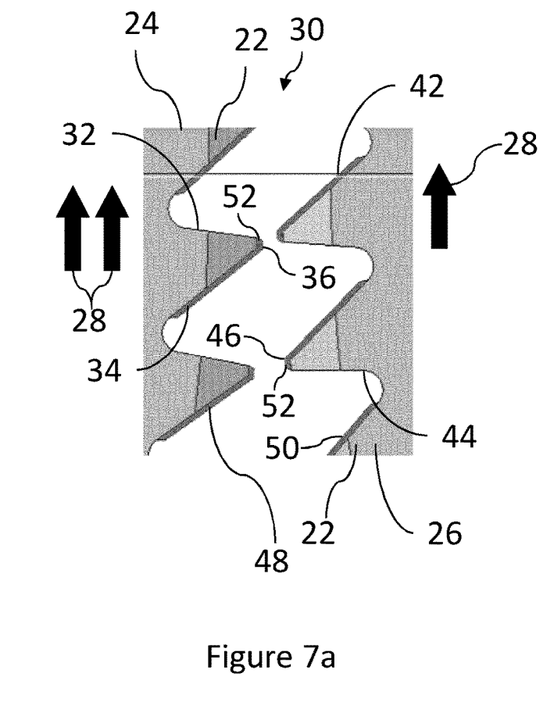
FIGS. 7a and 7b are cross-sectional views of the crop comminuting rolls of FIG. 4, illustrating wear on a plurality of teeth of the crop comminuting rolls during use of the crop processor.
Figure 7B:
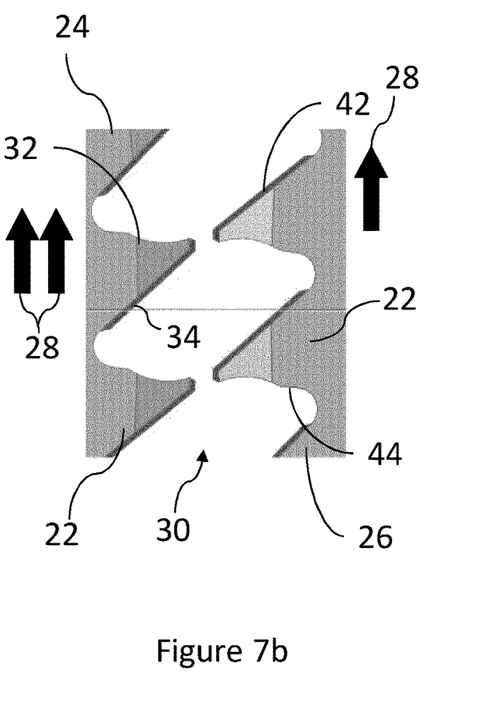

Owing to the rotation of the comminuting rolls 24, 26, the teeth 22 are functionally defined as comprising a leading edge 32, 42 and a trailing edge 34, 44, as shown in FIGS. 6, 7a and 7b. The leading edge 32, 42 of each tooth is defined as the edge which faces in—or is arranged to face in—the direction of the movement of the comminuting roll 24, 26 (as indicated by the arrows 28). The trailing edge 34, 44 of each tooth 22 is defined as the tooth edge which faces in a reverse direction to the rotational movement of the crop comminuting roll on which it is arranged (i.e. being arranged so as to face in the opposing direction to the corresponding leading edge 32, 42).

Each of the plurality of teeth 22 of the first comminuting roll 24 further comprises a substantially flat-top edge 36. In this way, a tip region 38 of each tooth is thus not point-shaped but has a flattened outer—or peripheral—surface. Each flat-top edge 36 comprises a width (W), which is measured in the circumferential direction of the respective comminuting roll on which the tooth is formed, as shown in FIG. 6. The teeth 22 of the second comminuting roll 26 are also configured with flat-top edges 46 having the same dimensions as the teeth of the first comminuting roll 24, as indicated in FIG. 7a.

The asymmetrical profile—or shape—of the teeth 22 is such that each tooth may be described as comprising an 'aggressively sloped' side and a 'shallow sloped' side. For example, the teeth 22 of the first comminuting roll 24 each have a first side comprising a steep slope—also referred to as the aggressively sloped side—and a second side with a shallower slope—also referred to as the shallow sloped side. According to the exemplary arrangement described herein, the first communitive roll 24 is configured such that the aggressively sloped side is the leading edge 32 and the shallow sloped side is the trailing edge 34. The second communitive roll 26 is arranged such that the aggressively sloped side of the teeth is the trailing edge 44 and the shallow sloped side is the leading edge 42.

Owing to the asymmetric profile of the teeth, the plurality of the teeth can be defined as having an inherent directionality based on the direction in which the aggressive edge is facing. Further, the plurality of teeth 22 of the first and second comminuting rolls are arranged with the same directionality. For the case of the first comminuting roll 24, the plurality of teeth 22 are arranged such that they are pointing in the rotation direction of the roll. By contrast, the teeth 22 of the second comminuting roll 26 are pointing in a direction which opposes the rotation direction of the second comminuting roll 26.

During operation of the crop processor 10, the comminuting rolls 24, 26 are arranged in such a manner that the harvested crop which enters the crop processor 10 via the inlet 14 is engaged, initially, by the aggressively sloped side of the teeth of the first comminuting roll 24 and the shallow sloped side of the teeth of the second comminuting roll 26. A majority of the kernel cracking is done between the aggressively sloped sides of the teeth of the first and second comminuting rolls 24, 26 the rolls, which is caused primarily due to the relative speed differential between the rolls. As the crop passes through the opening 30, it is further engaged by the other edges of the teeth, including the respective trailing, leading and flat-top edges.

It will be appreciated that, whilst the crop comminuting rolls 18 according to the presently described embodiment are each provided with a plurality of teeth 22 having an asymmetrical profile, the comminuting rolls 24, 26 may be configured, alternatively, with symmetrically shaped teeth having leading, trailing and flat-topped edges as described above.

During use, the communitive rolls 24, 26 are configured to rotate at different speeds. According to the exemplary arrangement described herein, the first comminuting roll 24 is arranged to rotate at a greater speed than the second comminuting roll 26, as indicated by the double arrows 28 shown in FIGS. 7a and 7b. Hence, during operation of the crop processor 10, the crop kernels which pass through the opening 30 between the rolls are crushed between the leading edge 32 of the teeth of the first (faster rotating) comminuting roll 24 and the trailing edge 44 of the second (slower rotating) comminuting roll 26. The speed differential between the first and second comminuting rolls 24, 26 is at least 10%, and no more than 50%, in order to affect the crop kernel cracking.

During use, an irregular flow of harvested crop leads to the irregular wear of the length of each comminuting roll. In particular, a greater flow of harvested crop material passing through the center of the rolls than at the sides causes more wear in the center than at the sides, which results in an unequal opening between the rolls. As a result, the effectiveness of the kernel cracking process of the harvested crop deteriorates over time. The comminuting rolls must then be replaced at more regular intervals due to the irregular wearing of the comminuting rolls, thereby increasing the maintenance costs of the forage harvester. It will be appreciated, that the above described wear process can also occur when a symmetrical tooth profile is applied to the comminuting rolls. In addition, the cracking process itself also results in wear of the teeth and thus results in the occurrence of an irregularly enlarged opening between the rolls.

To enable the teeth to withstand wear caused by kernel cracking, it is known to configure the teeth of the comminuting rolls such that the leading and trailing edges of the teeth exhibit an elevated uniform hardness. For example, the comminuting rolls may be manufactured from a material which has, or is configured to have, a uniform surface hardness. First, the comminuting rolls are subjected to an induction hardening treatment which involves inducing an alternating magnetic field in the surface of the comminuting rolls to cause localised heating of the peripheral surface to a temperature which is above the transformation range of the constituent alloy. The localised heating leads to hardening of the surface of the comminuting rolls, whilst its core remains substantially unaffected by the treatment. The resulting heat treatment has an equal hardening effect on both the leading and trailing edges of the teeth.

To further increase the wear resistance of the comminuting rolls, the surface of the teeth (i.e. both the leading and trailing edges) can also be coated with a thin hard chrome layer, following the induction hardening treatment. Such chrome plating techniques typically require the use of hexavalent chromium which is a toxic substance, the use of which is increasingly restricted by government legislation.

A drawback of induction hardening process is that it tends to concentrate energy in the tip region of the teeth, which can cause localised melting of the tip region. The hardening process also causes deformation in the roll due to metallurgical transitions in the material.

Furthermore, the chrome electro-plating process causes indiscriminate hardening of both the leading and trailing edges of the teeth, which contributes to the irregular wearing of the comminuting rolls during operation of the crop processor, as described above. In particular, the uniform hardening causes a gradual, but irreversible blunting of the teeth of the comminuting rolls during operation of the crop processor.

In accordance with the present invention, an alternative arrangement of the first and second comminuting rolls 24, 26 is proposed which is less susceptible to wear. This is realised by configuring the second (slower moving) comminuting roll 26 such that the leading edges 42 of the plurality of teeth are provided with a hard region 50, which has a greater hardness than the leading edge 32 of the teeth of the first (faster moving) comminuting roll 24.

The advantageous benefits of the hard region 50 can be appreciated by considering the operation of the crop processor 10, as illustrated in FIGS. 7a and 7b. During operation of the crop processor 10, crop material is directed towards the comminuting rolls 24, 26, from below. The rotation of the comminuting rolls causes the crop material to be engaged by the leading edges 32, 42 of each comminuting roll 24, 26. The motion of the teeth's leading edges 32, 42 directs the crop material in a substantially upward direction towards the opening 30. As the crop material approaches the narrowest point of the opening 30, the relative speed differential between the comminuting rolls 24, 26 causes the opposing sets of teeth to grip the crop material, effectively tearing it apart.

The above described grinding process leads to the leading edges 32 of the teeth of the first comminuting roll 24 to be worn at an increased rate, relative to the leading edge 42 of the teeth of the second comminuting roll 26. This is due to the increased hardness of the hard region 50 on the second comminuting roll 26 and, in particular, its ability to withstand the abrasive forces associated with the kernel cracking process. The preferential wearing of the leading edge 32 leads to a sharpening of the teeth of the first comminuting roll 24, as indicated by the convex shaping of the teeth in FIG. 7b. Advantageously, this sharpening effect helps to prolong the life of the comminuting roll 24, which thereby reduces the maintenance costs associated with the crop processor 10.

A further hard region 48 is provided on the trailing edge 34 of the first comminuting roll 24. This hard region 48 is arranged to exhibit a greater hardness than the leading edge 32 of the teeth of the first comminuting roll 24. The hard region 48 of the teeth 22 of the first comminuting roll 24 further contributes to the preferential wearing of the leading 32 and trailing edges 44 of the teeth of the first and second comminuting rolls 24, 26, respectively. Similarly to the first comminuting roll 24, the trailing edge 44 of the second comminuting roll 26 is caused to wear away quicker than the hard region 50 of the leading edge 42, which will result in a sharpening of the teeth 22 of the second comminuting roll 26 during operation of the crop processor 10. Accordingly, the hard regions 48, 50 are arranged to exhibit a greater hardness than the trailing edge 44 of the teeth of the second comminuting roll 26.

The flat-top edges 36, 46 of the teeth are also provided with a hard region 52 having a greater hardness than each of the leading edge 32 of the teeth of the first comminuting roll 24 and the trailing edge 44 of the teeth of the second comminuting roll 26. The hard region 52 defines a continuation of hard regions 48, 50 of the leading 42 and trailing 34 edges of the teeth of the first and second comminuting rolls 24, 26, respectively, as illustrated in FIGS. 6 and 7a.

Each of the hard regions 48, 50, 52 is arranged to cover at least a portion of the underlying surface of the edge onto which they are provided. For example, the hard region 48 is arranged to extend over a portion (P) of the trailing edge 34 of the teeth of the comminuting roll 24, as shown in FIG. 6. The proportion of the teeth surface which is covered by the hard region is determined according to the wear requirements of the roll, as will appreciated by the person having ordinary skill in the art.

The laser-cladding process enables the selective deposition of the wear resistant layer onto just one of the leading and trailing edges of the teeth, which thereby enables the sharpening effect as described above. The laser cladding process will now be described with particular reference to FIG. 8, which illustrates the first comminuting roll 24 undergoing the laser-cladding treatment in isolation from crop processor 10.

Figure 8:
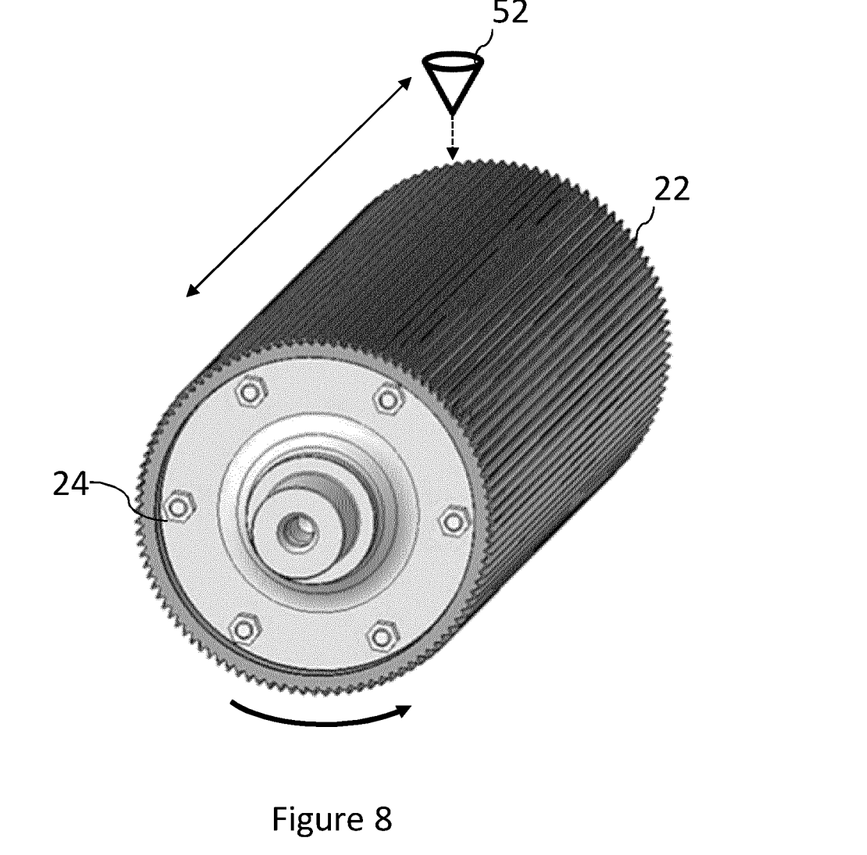
FIG. 8 is a schematic view of a method of depositing a wear resistant layer on the plurality of teeth of a crop comminuting roll.

A laser cladding system is used to deposit the wear resistant material on to the edge of the teeth which is to be hardened. A laser source of the cladding system is configured to direct a laser beam on to the surface of the teeth creating a melt pool. A nozzle 52 of the cladding system provides a stream of powdered precursor, which interacts with the melt pool to form a metal-to-metal bond between the wear resistant material and the underlying surface of the teeth. To achieve this, the nozzle 52 is linearly translated along the length of the comminuting roll 24, in a direction which is substantially parallel with its rotation axis, whilst continuously depositing a narrow track of molten material along the trailing edge 34 of a single tooth 22 of the first comminuting roll 24 (i.e. the less aggressive tooth edge).

Once the nozzle 52 has reached one end of the comminuting roll 24, the comminuting roll 24 is rotated incrementally in order to align the nozzle 52 with the trailing edge 34 of the neighbouring tooth of the roll 24. The nozzle 52 is then translated in the opposite direction along the length of the roll 24 depositing the molten wear resistant layer as it goes. This process is then continued until each of the trailing edges 34 of the teeth 22 of the first comminuting roll 24 have been clad with the wear resistant material. The laser-cladding process is then applied to the second comminuting roll 26.

According to an alternative cladding method, the comminuting roll is installed on a lathe-type machine and rotated during the deposition of the wear resistant material. In particular, the roll is rotated while the nozzle 52 is configured to move from one end of the roll to the other end, in a longitudinal direction. The wear resistant layer is therefore applied in a densely packed spiral pattern along the length of the roll. The rotational and lateral speeds of the roll and the nozzle are controlled, respectively, so as to produce a continuous wear resistant layer along the length of each tooth.

The dispensing nozzle 52 is configured to deposit a narrow track of molten wear resistant material such that it only covers a portion (P) of the trailing edge 34, as shown in FIG. 6. Translating the nozzle 52 along the length of the roll 24 allows the melt pool to solidify and thus produces a continuous layer of solid material.

Laser cladding of the hard region 48 improves the wear resistance of the coated teeth due to high tungsten carbide composition of the wear resistant material. The resulting wear resistant layer has a composition of tungsten carbide.

The wear resistant layer is fused at high temperature onto the teeth in order to form a strong bond between it and the underlying roll surface. This is in contrast to the known chrome facing techniques which, due to the electrolytic process, means that there is no real metallic binding between the base material and the hard chrome layer. Accordingly, the wear resistant material of the hard regions 48, 50, 52 is able to withstand impacts from hard stones without risking the layer being chipped off from the teeth, as is common with an electroplated chrome layer.

Laser cladding enables the deposition of wear resistant material between individual features of the finely serrated peripheral surface of the rolls (i.e. between the individual teeth). The heat input of the laser cladding process is small and local to the surface of the rolls so that the underlying material does not melt away, which thereby minimises the deformation of the rolls. Thus, the above described laser cladding process is suitable for comminuting rolls 18 formed of induction hardened alloy compositions.

The comminuting rolls 24, 26 are formed of a material which is configured to provide a hardened surface when subjected to an air hardening process. The air hardening process involves allowing a cast metal alloy to cool over a relatively long cooling period. This is typically achieved by allowing the metal alloy roll to be cooled in air. The air hardening approach is distinct from alternative methods of forming metal alloy components which involve quenching in a fluid, such as water. The speed of the cooling due to air hardening causes slow dissipation of thermal energy from a small melted zone at the surface of the roll into the rest of the material, which results in the formation of a hard surface layer of each comminuting roll 24, 26. The air hardening process advantageously alleviates the need to use additional surface treatments such as inductive hardening which can cause localised deformation of the teeth, particularly in the tip region 38.

Once the teeth have been machined into the rolls, they are subjected to a hardening process. According to a first hardening process, the cylindrically shaped rolls are heated up to a suitable hardening temperature and then allowed to cool in air. In particular, the first and second comminuting rolls 24, 26, are air hardened to form a surface with a hardness which is sufficient to withstand the grinding of crop kernels during the operation of the crop processor 10. The air hardening of the rolls is performed prior to depositing of the wear resistant material. In order to facilitate the air hardening process, the teeth are manufactured from steel, or any suitable material which has sufficient hardenability to enable air hardening of the teeth surfaces.

Alternatively, air hardening of the teeth may be implemented due to the heat input from the laser cladding process. In particular, the laser source of the cladding system is configured to form a melt pool on the surface of the teeth during the laser cladding process. The melt pool defines a heat treated region of the teeth which undergoes air hardening as it cools. Air hardening is thereby achieved after the deposition of the wear resistant layer.

According to an alternative hardening process, the teeth may be subjected to a laser hardening process. In this case, the heat used to perform the hardening process is provided by a high powered laser, which is configured to direct a beam of laser light on to an edge of the teeth. Once the laser treated edge has been heated, it is then allowed to cool in air. In this way, the laser treated edge is air hardened.

The laser hardening process is used to harden the un-clad surface of each tooth, i.e. the edge of the tooth which is not clad with wear resistant material. The laser hardening process creates a heated zone under the laser treated edge of the teeth. The heated zone exhibits increased hardness, relative to the remainder of the teeth. Advantageously, the laser hardening process enables individual edges of the teeth to be targeted, without affecting other regions of the teeth. The laser hardening process may be performed either before or after the cladding of the wear resistant layer. In order to facilitate the laser hardening, the teeth should be manufactured from steel, or any suitable material which has sufficient hardenability to enable air hardening of the teeth surfaces.

The air-hardened teeth surface leads to the preferential wearing of those teeth edges which are not subjected to the laser-cladding treatment, thereby leading to the sharpening effect as described above. Advantageously, each of the steel compositions enable the forming of an air hardened surface region of the teeth which exhibits a hardness rating within the prescribed hardness range. Advantageously, it is the selective deposition of the hard regions 48, 50 which, when combined with the underlying air-hardened alloy of the comminuting rolls 24, 26, enables the sharpening effect of the un-treated edges (i.e. the teeth edges which are not provided with a laser-clad hard region) of the teeth 22, as shown in FIG. 7b.

The laser hardening treatment may be selectively applied to the teeth 22 in order to increase the wear resistance of the non-cladded edge of the teeth 22. The wear resistance of the laser treated edge is still less than that of the wear resistance layer which is formed on the teeth 22 of the opposing comminuting roll. Therefore, the self-sharpening effect is retained due to the relative difference in wear resistance—or hardness—between the cladded and non-cladded edges of the teeth 22 arranged on the opposing comminuting rolls 24, 26.

Manufacturing a crop processor 10 in accordance with the present invention requires the manufacture of crop comminuting rolls 18, as described above. Crop comminuting rolls are made from metal, often a ferrous metal. Starting from a cylindrically shaped roll, various processes are performed such as machining the teeth and hardening the machined roll, in order to arrive at a roll that can be applied in a crop processor 10. A method 80, 180 of manufacturing a crop processor 10, according to an aspect of the present invention, will now be described with reference to FIGS. 8 and 9, in particular.

Figure 9:
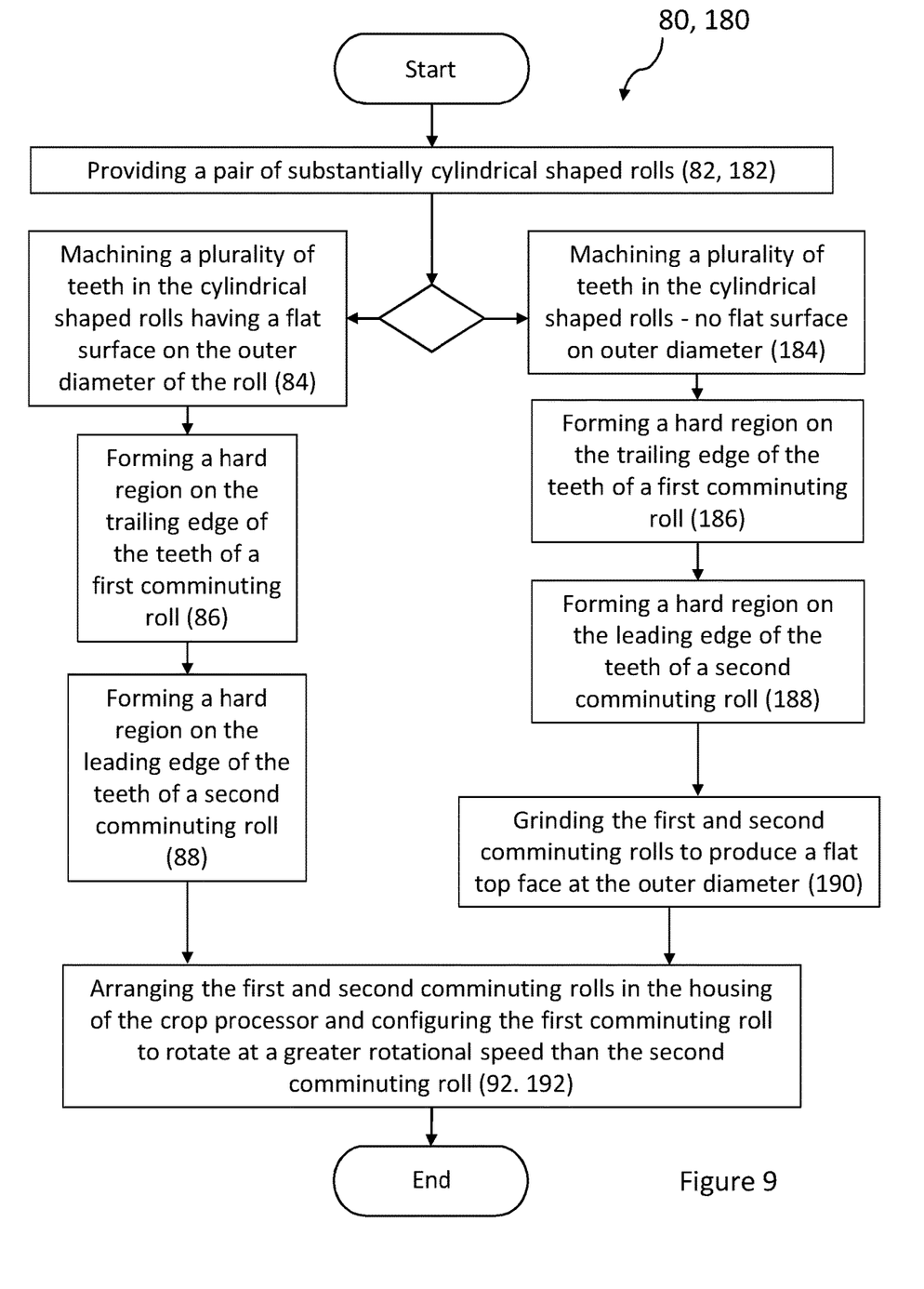
FIG. 9 is a flow chart showing the method steps of a method suitable, according to the present invention, of manufacturing a crop processor.

The manufacturing method 80 commences with manufacturing a first and a second comminuting roll 24, 26. In a first method step 82, 182, a pair of substantially cylindrical shaped rolls is provided. As described above, the comminuting rolls 24, 26 are made of a material which can be configured to provide a hard surface when subjected to air hardening, so as to enable the sharpening effect of the un-treated edges of the teeth 22. To enable the self-sharpening effect, the un-treated edge of the teeth 22 must therefore be softer than the treated edge. The plurality of teeth may be manufactured from at least one of steel alloys.

In a second method step 84, 184, a plurality of teeth 22 are formed by machining the plurality of teeth into the substantially cylindrically shaped rolls, thereby maintaining part of an outer surface of the rolls unaffected. The resulting teeth 22 each comprise a leading edge 32, 42 arranged, during use, to face in a rotation direction of the comminuting roll 24, 26, and a trailing edge 34, 44 which faces away from the rotation direction of the crop comminuting roll 24, 26, as described above. The rolls are machined such that they retain a flat surface on the outer diameter of the rolls. The flat edge defines the flat top edge 36, 46 of the teeth 22 of the comminuting rolls 24, 26. Alternatively, the rolls may be machined such that they do not retain a flat top surface on the outer diameter of the rolls, according to a variant of the second method step 184. Accordingly, the teeth which are formed using this method do not yet comprise a flat top edge, which may be provided in a later manufacturing step.

In a third method step 86, 186, a hardened surface 48 is formed on the trailing edge 34 of the teeth of the first comminuting roll 24. In a fourth step 88, 188, a hardened surface 50 is formed on the leading edge 42 of the teeth 22 of the second comminuting roll 26. It will be appreciated that the method steps 86, 186 and 88, 188 may be carried out in any order. Forming each of the hardened surfaces 48, 50 comprises laser-cladding a wear resistant layer onto the trailing 34 and leading 42 edges of the teeth 22 of the first and second comminuting rolls 24, 26, respectively. Prior to the forming the wear resistant layer, the comminuting rolls may be subjected to an air hardening treatment. Alternatively, air hardening may be achieved after deposition of the wear resistant layer due to the heat input from the laser cladding process. Optionally, the teeth may be subjected to a separate laser hardening treatment, as described above.

Figure 10:
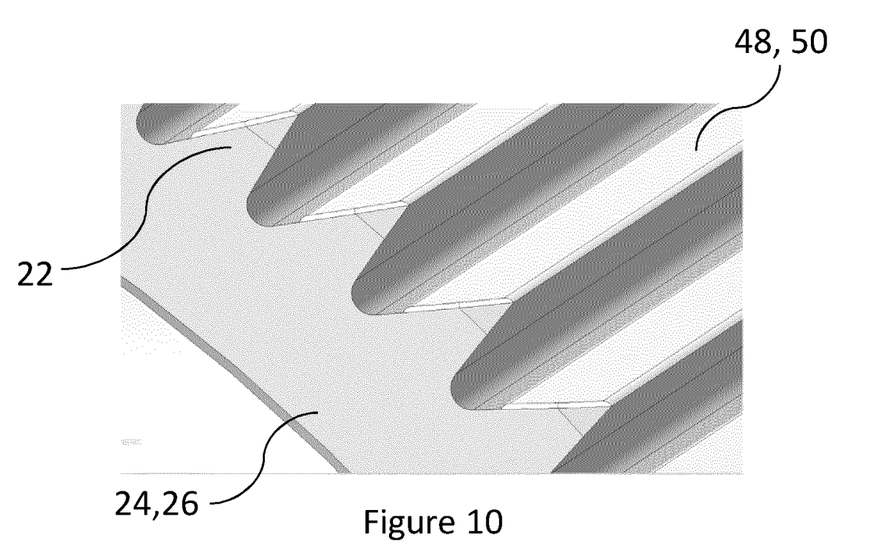
FIGS. 10 and 11 are perspective views of a plurality of teeth of a comminuting roll, illustrating the profile of the teeth before and after a grinding process, respectively.

According to the variant of the second method step 182 as described above, the rolls are machined with a plurality of teeth without forming an outer flat surface at the roll diameter. The rolls that have been machined in this way are now subjected to an additional method step 190, in which a substantially flat-top edge is machined—or ground—onto the plurality of teeth. The flat-top edge grinding process is arranged to follow the deposition of the hard region 48, 50. The effect of the grinding process is illustrated in FIGS. 10 and 11, which show the teeth 22 of a comminuting roll before and after the grinding has taken place, respectively.

The grinding process ensures that the finished rolls 24, 26 are cylindrical after the laser cladding. The grinding process also produces a sharp edge at the hard region 48, 50 towards the tip region of the teeth 22. It also defines the flat-top edge 36, 46 at the outer diameter of the comminuting roll 24, 26. The effect of the grinding process reduces the variation in the shape of the deposited hard region 48, 50, which occurs due to the surface tension of the molten phase during deposition. The surface tension can result in a rounded outer edge in the tip region 38 of the teeth 22, as illustrated in FIG. 10. The resulting variation in the hard region 48, 50 can create an uneven reduction in the diameter of the rolls. This rounding can result in an inconsistent opening 30 between the comminuting rolls 24, 26.

Figure 11:
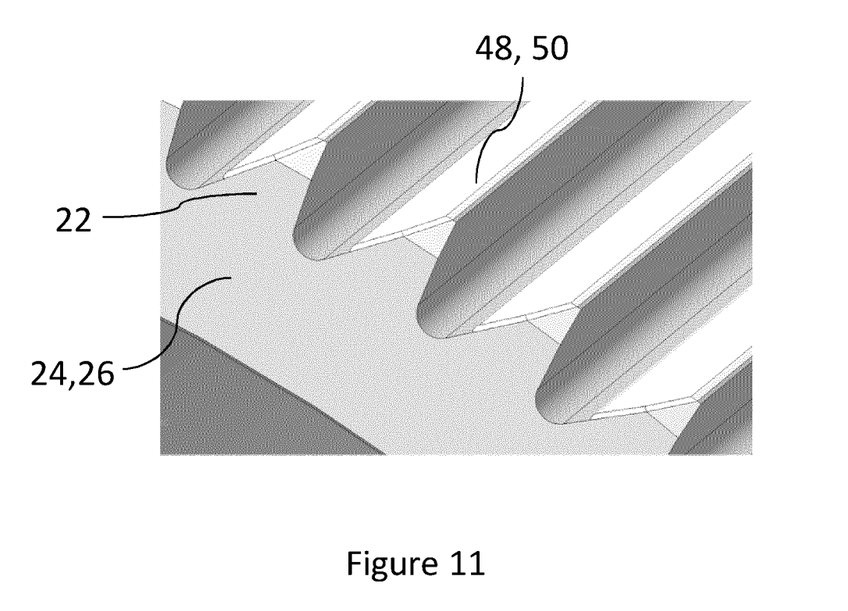

Advantageously, the grinding process removes the rounding of the hard region 48, 50, thereby producing a sharp edge at the flat-top edge 36, 46 of the teeth 22, as shown in FIG. 11. The grinding process also helps to reverse any deterioration in the cylindricity of the comminuting rolls 24, 26 which may be caused due to slight variations in the layer thickness of the hard region 48, 50. The flat-top edges also help to maintain the spacing (S) between the comminuting rolls 24, 26 when they are installed within the crop processor, as shown in FIG. 5. An accurate and consistent cylindricity of the comminuting rolls 24, 26 is needed in order to achieve a correct and narrow alignment of the roll 24, 26. In particular, the combined laser-cladding and grinding processes enable the opening 30 to be configured, over the entire length of the rolls, within a clearance of 1 mm.

In a final method step 92, 192, the comminuting rolls 24, 26 are assembled into the crop processor housing 12. The comminuting rolls 24, 26 are arranged in parallel so as to define the opening 30 between the comminuting rolls 24, 26. The comminuting rolls 24, 26 are configured to rotate, during use, in opposing directions to transport a flow of harvested crop kernels, received from the inlet 14, through the opening 30 towards the outlet 16. The first comminuting roll 24 is configured to rotate at a greater speed than the second comminuting roll 26.

The invention claimed is:

1. A crop processor for cracking kernels in a forage harvester, the crop processor comprising: a housing having an inlet and an outlet; and a first comminuting roll and a second comminuting roll, both mounted inside the housing, the first comminuting roll and the second comminuting roll being arranged in parallel to define an opening between the first comminuting roll and the second comminuting roll, wherein the first comminuting roll and the second comminuting roll are configured to rotate, during use, in opposing rotation directions to transport a flow of harvested crop, received from the inlet, through the opening towards the outlet, wherein the first comminuting roll is configured to rotate at a greater speed than the second comminuting roll,
wherein the first comminuting roll and the second comminuting roll each comprise a plurality of teeth arranged on a circumferential surface thereof, each of the plurality of teeth comprising a leading edge which faces in the rotation direction of the comminuting roll on which the plurality of teeth are arranged,
wherein the leading edge of the teeth of the second comminuting roll comprises a hard region having a greater hardness than the leading edge of the teeth of the first comminuting roll, and
wherein the plurality of teeth of the first comminuting roll comprise a substantially flat-top edge; wherein the substantially flat-top edge comprises a hard region having a greater hardness than the leading edge of the teeth of the first comminuting roll.

2. The crop processor according to claim 1, wherein a trailing edge of the teeth of the first comminuting roll comprises a hard region having a greater hardness than the leading edge of the teeth of the first comminuting roll.

3. The crop processor according to claim 1, wherein the hard region of the leading edge of the teeth of the second comminuting roll has a greater hardness than a trailing edge of the teeth of the second comminuting roll.

4. The crop processor according to claim 1, wherein the plurality of teeth of the second comminuting roll comprise a substantially flat-top edge; wherein the substantially flat-top edge comprises a hard region having a greater hardness than the trailing edge of the teeth of the second comminuting roll.

5. The crop processor according to claim 1, wherein the hard region comprises a wear resistant layer having been deposited by laser-cladding.

6. The crop processor according to claim 1, wherein the teeth comprise an air hardened surface region.

7. The crop processor according to claim 1, wherein at least one edge of the teeth comprise a laser hardened surface region.

8. The crop processor according to claim 1, wherein the plurality of teeth have an asymmetrical profile in an axial section of the comminuting roll on which the plurality of teeth are arranged.

9. A forage harvester comprising a crop processor according to claim 1.

10. A method of manufacturing a crop processor for cracking kernels in a forage harvester, the method comprising:
manufacturing a first comminuting roll and a second comminuting roll; and
assembling the comminuting rolls into a housing having an inlet and an outlet, the first comminuting roll and the second comminuting roll being arranged in parallel to define an opening between the first comminuting roll and the second comminuting roll,
wherein the first comminuting roll and the second comminuting roll are configured to rotate, during use, in opposing directions to transport a flow of harvested crop, received from the inlet, through the opening towards the outlet,
wherein the first comminuting roll is configured to rotate at a greater speed than the second comminuting roll, and wherein manufacturing the first comminuting roll and the second comminuting roll comprises:
providing a pair of substantially cylindrical shaped rolls;
machining a plurality of teeth in the substantially cylindrical shaped rolls, each of the plurality of teeth comprising a leading edge arranged, during use, to face in a rotation direction of the crop comminuting roll in which the plurality of teeth are machined;
forming a hard region on the leading edge of the teeth of the second comminuting roll, the hard region having a greater hardness than the leading edge of the teeth of the first comminuting roll; and
wherein the plurality of teeth of the first comminuting roll comprise a substantially flat-top edge;
wherein the substantially flat-top edge comprises a hard region having a greater hardness than the leading edge of the teeth of the first comminuting roll.

11. The method according to claim 10, wherein the method further comprises forming a hard region on a trailing edge of the teeth of the first comminuting roll arranged to face away from the rotation direction of first comminuting roll, the hard region having a greater hardness than the leading edge of the teeth of the first comminuting roll.

12. The method according to claim 10, wherein forming the hard region comprises forming the hard region on the leading edge of the teeth of the second comminuting roll to have a greater hardness than a trailing edge of the teeth of the second comminuting roll, the trailing edge being arranged to face away from the rotation direction of the second comminuting roll.

13. The method according to claim 10, wherein forming the hard region comprises laser-cladding a wear resistant layer onto an edge of the teeth of at least one of the first comminuting roll and the second comminuting roll.

14. The method according to claim 13, wherein manufacturing the first comminuting roll and the second comminuting roll further comprises air hardening at least one edge of the teeth.

* * * * *